United States Patent
Jang et al.

(10) Patent No.: US 9,515,906 B2
(45) Date of Patent: Dec. 6, 2016

(54) TRANSCEIVER INTEGRATED CIRCUIT DEVICE AND METHOD OF OPERATION THEREOF

(71) Applicants: Hyundai Motor Company, Seoul (KR); Kia Motors Corporation, Seoul (KR)

(72) Inventors: Sang Hyun Jang, Gyeonggi-do (KR); Hee Jun Lee, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 275 days.

(21) Appl. No.: 14/299,522

(22) Filed: Jun. 9, 2014

(65) Prior Publication Data

US 2015/0200825 A1 Jul. 16, 2015

(30) Foreign Application Priority Data

Jan. 10, 2014 (KR) .................. 10-2014-0003591

(51) Int. Cl.
  *H04L 12/26* (2006.01)
  *H04L 29/14* (2006.01)
  (Continued)

(52) U.S. Cl.
  CPC ....... *H04L 43/0817* (2013.01); *H04L 12/4625* (2013.01); *H04L 41/06* (2013.01);
  (Continued)

(58) Field of Classification Search
  CPC ........... H04L 43/0817; H04L 43/0823; H04L 12/4625; H04L 41/0672; H04L 41/06; H04L 67/12; H04L 2012/40215; G05B 2219/25032
  See application file for complete search history.

(56) References Cited

U.S. PATENT DOCUMENTS

| 5,787,117 A * | 7/1998 | Ash .................. H04B 1/40 330/310 |
| 2003/0233156 A1* | 12/2003 | Pihet .................. G05B 19/0428 700/79 |
| 2013/0212312 A1* | 8/2013 | Heiling .............. H04L 12/40169 710/305 |

FOREIGN PATENT DOCUMENTS

| JP | 2005277896 A | 10/2005 |
| JP | 2006333438 A | 12/2006 |

(Continued)

OTHER PUBLICATIONS

Dudu, T. S. Shamin, S. G. Shivaprasad Yadav, M. Arun Kumar, and Nisha C. Rani. "In-Vehicle Automotive Network Gateway Electronic Control Unit for Low Price Vehicle." SASTech vol. 8, Issue 2, Sep. 2009.*

(Continued)

*Primary Examiner* — Michael Maskulinski
*Assistant Examiner* — Anthony J Amoroso
(74) *Attorney, Agent, or Firm* — Mintz Levin Cohn Ferris Glovsky and Popeo, P.C.; Peter F. Corless

(57) ABSTRACT

A transceiver integrated circuit (IC) device for a multi-channel, and a method of operating the same are provided. The transceiver IC device transmits and receives information and data between a central gateway (CGW) and a plurality of electronic control units (ECUs) using a controller area network (CAN). The transceiver IC device includes a plurality of CAN transceivers and a monitoring sensor that detects whether a transceiver IC device operates normally. A wake-up detector detects a wake-up signal transmitted via a network and a controller transmits and receives a CAN signal to and from the plurality of CAN transceivers. In addition, a serial peripheral interface (SPI) communication portion transmits and receives information and data from the controller to and from a microcomputer of the CGW.

15 Claims, 7 Drawing Sheets

(51) Int. Cl.
*H04L 12/24* (2006.01)
*H04L 29/08* (2006.01)
*H04L 12/46* (2006.01)
*H04L 12/40* (2006.01)

(52) U.S. Cl.
CPC ....... *H04L41/0672* (2013.01); *H04L 43/0823* (2013.01); *H04L 67/12* (2013.01); *H04L 2012/40215* (2013.01)

(56) References Cited

FOREIGN PATENT DOCUMENTS

| | | |
|---|---|---|
| JP | 2007036632 A | 2/2007 |
| KR | 10-0756745 B1 | 9/2007 |
| KR | 10-2010-0086211 A | 7/2010 |
| KR | 10-2012-0057157 A | 6/2012 |

OTHER PUBLICATIONS

M. Müter, A. Groll and F. C. Freiling, "A structured approach to anomaly detection for in-vehicle networks," Information Assurance and Security (IAS), 2010 Sixth International Conference on, Atlanta, GA, 2010, pp. 92-98.*

Johansson, Karl Henrik, Martin Törngren, and Lars Nielsen. "Vehicle applications of controller area network." In Handbook of networked and embedded control systems, pp. 741-765. Birkhäuser Boston, 2005.*

* cited by examiner

T21   T22

TRANSCEIVER INTEGRATED CIRCUIT DEVICE AND METHOD OF OPERATION THEREOF

CROSS-REFERENCE TO RELATED APPLICATION

This application claims priority to and the benefit of Korean Patent Application No. 10-2014-0003591 filed in the Korean Intellectual Property Office on Jan. 10, 2014, the entire contents of which are incorporated herein by reference.

BACKGROUND (a) Field of the Invention

The present invention relates to a transceiver integrated circuit (IC) device for multi-channels, and a method of operation thereof.

(b) Description of the Related Art

As electronics for vehicles develop, many various electronic control units (ECUs) are increasingly provided within the vehicles. A method of controller area network (CAN) communication is mainly used for communicating between the ECUs. The CAN developed for a network within a vehicle is a communication method using a serial communication network, it interconnects various ECUs in parallel using two communication lines, and it processes information between the various ECUs according to priority. The ECUs interconnected in a CAN communication network check contents of transmitted messages and determine a priority of the transmitted messages through an identifier (ID). In addition, the ECUs are selectively input with corresponding messages according to the contents of the transmitted messages.

A priority between CAN nodes is determined based on bitwise arbitration, a node having the highest priority enters a transmission mode for transmitting a message, and nodes having other priorities become receiving modes for receiving messages. The nodes of the receiving mode are disabled until their turn. Some vehicles in product development and mass production may use a gateway for transmitting and receiving data between one network and the other networks. When the number of ECUs provided within a vehicle is substantially small, since the number of transmitted and received messages is then also substantially small, a specific ECU may perform a function of a gateway.

Recently, since the number of ECUs is rapidly increasing, a central gateway (CGW) has been developed and applied to process larger data between networks. The CGW is configured to receive data from one network, and use CAN transceiver chips therein to convert and transmit the received data to the other networks. For example, when the number of networks applied to a vehicle is 6, the number of CAN transceiver chips is also 6. In other words, as the number of networks is increased, the number of CAN transceiver chips is also increased. Accordingly, when the number of CAN transceiver chips is substantially large, a size of a controller for the CGW increases, which may cause a packaging problem within a vehicle.

The above information disclosed in this section is merely for enhancement of understanding of the background of the invention and therefore it may contain information that does not form the prior art that is already known in this country to a person of ordinary skill in the art.

SUMMARY

The present invention has been made in an effort to provide an integrated transceiver IC device and a method of operating the same.

An exemplary embodiment of the present invention provides an integrated transceiver IC device which may be configured to transmit and receive information and data between a central gateway (CGW) and a plurality of electronic control units (ECUs) using a controller area network (CAN). The transceiver IC device may include: a plurality of CAN transceivers, a monitoring portion configured to detect whether a transceiver IC device operates normally (e.g., without error), a wake-up detector configured to detect a wake-up signal transmitted via a network, a controller configured to transmit and receive a CAN signal to and from the plurality of CAN transceivers, and a serial peripheral interface (SPI) communication portion configured to transmit and receive information and data from the controller to and from a microcomputer of the CGW. The transceiver IC device may be configured to transmit a message received from the microcomputer to a plurality of electronic control units. The transceiver IC device may further include a voltage regulator configured to be input with a voltage from an external battery and output a voltage operating the transceiver IC device.

Another exemplary embodiment of the present invention provides a method of operating a transceiver integrated circuit (IC) device including a plurality of CAN transceivers which may be configured to transmit and receive information and data between a central gateway (CGW) and a plurality of electronic control units (ECUs) using a controller area network (CAN), including: detecting whether an ignition switch is turned on and a wake-up signal occurs; operating the transceiver IC device and a voltage regulator that supplies power to the transceiver IC device to be turned on; and supplying power output from the voltage regulator to a microcomputer of the CGW to turn on the microcomputer.

The method may further include first turning on at least two CAN transceivers among the CAN transceivers in parallel, and then turning on at least another two CAN transceivers among the CAN transceivers in parallel. The method may further include sequentially turning on the plurality of CAN transceivers.

According to an exemplary embodiment of the present invention, it may be possible to prevent an EMI noise and an overcurrent which may occur when a plurality of CAN transceivers are simultaneously turned on, by turning on a plurality of CAN transceiver chips of a multi-channel transceiver IC device in parallel or sequentially.

DETAILED DESCRIPTION

Figure 1:
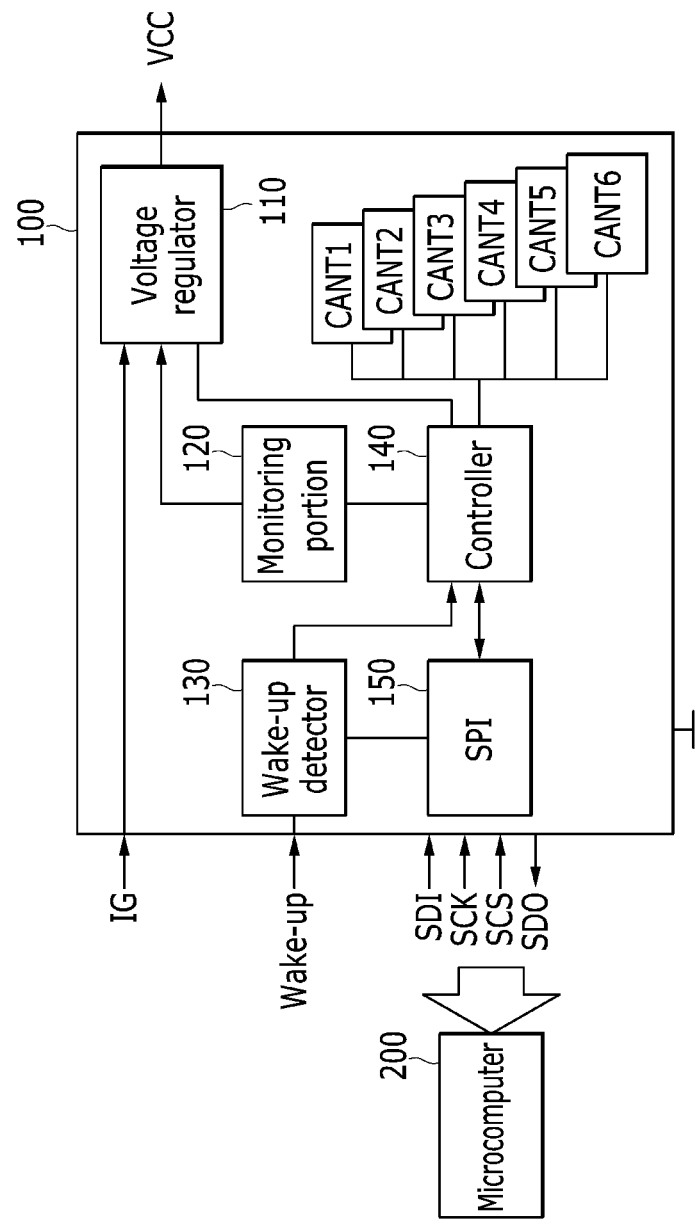
FIG. 1 shows an exemplary communication system for a vehicle according to an exemplary embodiment of the present invention.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present invention may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

In the following detailed description, exemplary embodiments of the present invention have been shown and described, simply by way of illustration. As those skilled in the art would realize, the described exemplary embodiments may be modified in various different ways, all without departing from the spirit or scope of the present invention. Accordingly, the drawings and description are to be regarded as illustrative in nature and not restrictive. Like reference numerals designate like elements throughout the specification.

Throughout this specification and the claims that follow, when it is described that an element is "coupled" to another element, the element may be "directly coupled" to the other element or "electrically coupled" to the other element through a third element. In addition, unless explicitly described to the contrary, the word "comprise" and variations such as "comprises" or "comprising" will be understood to imply the inclusion of stated elements but not the exclusion of any other elements.

The present invention will be described more fully hereinafter with reference to the accompanying drawings, in which exemplary embodiments of the invention may be easily embodied by those skilled in the art.

FIG. 1 shows an exemplary communication system for a vehicle according to an exemplary embodiment of the present invention. Referring to FIG. 1, a communication system for a vehicle an exemplary embodiment of the present invention may include a transceiver IC device 100 and a microcomputer 200. As shown in FIG. 1, the transceiver IC device 100 may include a plurality of CAN transceiver chips made with an application specific integrated circuit (ASIC).

The transceiver IC device 100 may be configured to transmit and receive information and data to and from a plurality of ECUs via a CAN. In addition, the transceiver IC device 100 may be configured to transmit and receive information and data between a CGW and a plurality of ECUs via a CAN. The transceiver IC device 100 may be configured to communicate with the microcomputer 200 of the CGW, and then transmit messages (SDO) received from the plurality of ECUs to the microcomputer 200 or transmit messages (SDI, SCK, and SCS) received from the microcomputer 200 to the plurality of ECUs. Although the plurality of ECUs are not shown in FIG. 1, they may be ECUs included in various electronic control systems for the vehicle.

The transceiver IC device 100 may include a voltage regulator 110, a monitoring portion 120 (e.g., a monitor or a monitoring sensor), a wake-up detector 130, a controller 140, an SPI communication portion 150 (e.g., an SPI communicator), and a first transceiver to a sixth CAN transceiver (CANT1-CANT6). The voltage regulator 110 may be configured to convert a voltage supplied from an exterior battery (not shown) to an internal voltage with a substantially constant level. The voltage regulator 110 may also be configured to output a predetermined power source voltage (VCC).

The monitoring portion 120 may be configured to detect whether the transceiver IC device 100 operates normally (e.g., without error or failure). The monitoring portion 120 may include a watchdog system, and may be configured to automatically reset the transceiver IC device 100 to allow the transceiver IC device 100 to operate normally again when the transceiver IC device 100 operates abnormally (e.g., with error or failure). When the monitoring portion 120 detects that the transceiver IC device 100 is operated abnormally, the monitoring portion 120 may be configured to stop an operation of the voltage regulator 110 and inform the controller 140 of the abnormality of the transceiver IC device 100.

The wake-up detector 130 may be configured to detect a wake-up signal transmitted via a network. A CAN wake-up function associated with the wake-up signal may be a function in which a dominant electronic control unit among the plurality of electronic control units may be configured to wake up the other electronic control units to be ready for operation, based on an external operating signal generated in a standby mode of a vehicle. For example, the standby mode may occur when a CAN communication is disabled after the engine of the vehicle is stopped in a parking state. Even though the engine of the vehicle is stopped, the dominant electronic control unit may remain in a wake-up mode, and the other electronic control units may be operated in a sleep mode that uses a least amount of current to prevent discharge of a battery. An ECU that receives the wake-up signal may be configured to enter a normal mode from the sleep mode.

The controller 140 may be configured to transmit and receive CAN signals to and to from the first to sixth CAN transceivers (CANT1-CANT6). The controller 140 may be supplied with an operation voltage from the voltage regulator 110. In addition, the controller 140 may be configured to communicate with the microcomputer 200 to transmit and receive necessary information via the SPI communication portion 150.

Figure 2:
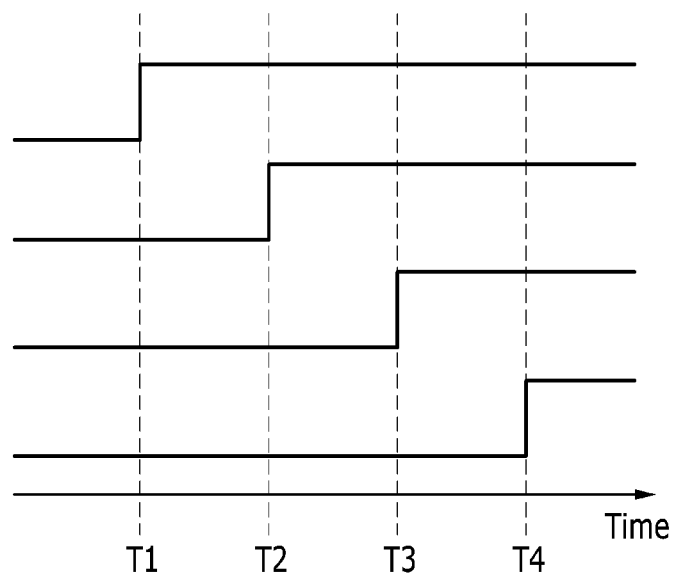
FIG. 2 shows an exemplary operation timing chart for a communication system according to an exemplary embodiment of the present invention.

FIG. 2 shows an operation timing chart for a communication system according to an exemplary embodiment of the present invention. Referring to FIG. 2, an ignition switch (IG) may first be turned on, or the wake-up detector 130 may be executed by the controller 140 to detect a wake-up signal, at time T1. Subsequently, the transceiver IC device 100 and the voltage regulator 110 may be turned on, at time T2.

The microcomputer 200 may be then supplied with a regulated voltage from the voltage regulator 110 to be turned on at time T3, and the SPI communication portion 150 may be turned on at time T4 while the transceiver IC device undergoes initialization. In other words, after the microcomputer 200 begins to operate, the SPI communication portion 150 may be turned on at time T4, and then information and data may be transmitted and received between the controller 140 and the microcomputer 200 via the SPI communication portion 150.

Figure 3:
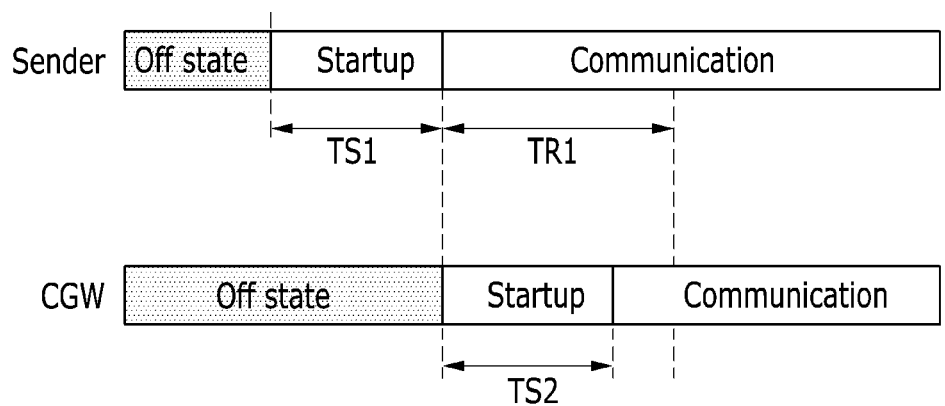
FIG. 3 shows an exemplary operation diagram of a CAN transceiver based on a wake-up signal according to an exemplary embodiment of the present invention.

FIG. 3 shows an exemplary operation diagram of a CAN transceiver based on a wake-up signal according to an exemplary embodiment of the present invention. As shown in FIG. 3, an initial message of a sender may be transmitted on a communication bus within the period TS1 while starting up by a wake-up event, and a CGW as a receiver may be ready to receive a message or signal within the ready period TR1. The ready period TR1 may include a startup period TS2 with respect to the CGW.

The initial message may include communication information transmitted from other ECUs and a battery management system (BMS) other than the CGW to the CGW. Particularly, the transceiver IC device 100 may be configured to operate as a receiver in an initial operation. Accordingly, when the CGW operates as a receiver, the CGW may prepare to receive a message or signal before receiving a first message from a transmitting node. The time in which the CAN transceivers (CANT1-CANT6) are turned on by a wake-up signal may be within the ready period TR1. For example, the ready period TR1 may be about several tens of milliseconds.

Figure 4:
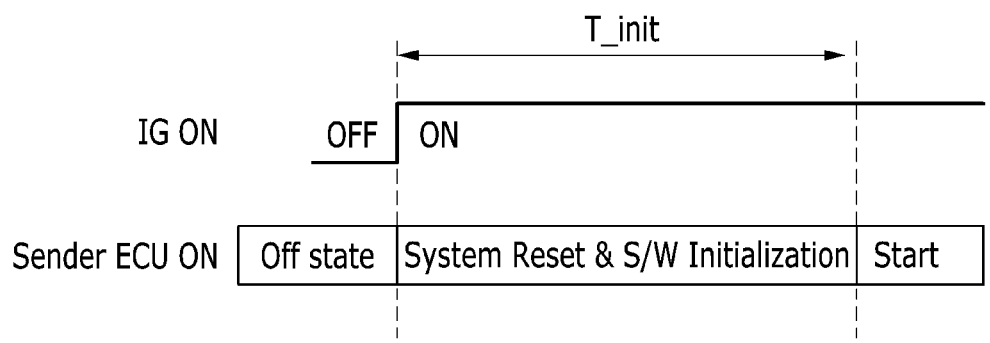
FIG. 4 shows an exemplary operation diagram of a CAN transceiver based on IG ON according to an exemplary embodiment of the present invention.

FIG. 4 shows an exemplary operation diagram of a CAN transceiver based on IG ON according to an exemplary embodiment of the present invention. The nodes may prepare to receive a message within a period T_init of a system reset and software initialization. For example, the period T_init may be a maximum of several hundreds of milliseconds. As described above, since a minimum time in which the transceiver IC device of the CGW is turned on may be the ready period TR1 as shown in FIG. 3, the transceiver IC device may be turned on within the ready period TR1.

When an ignition switch is turned on or a wake-up signal occurs, the CAN transceivers (CANT1-CANT6) may be turned on. When the CAN transceivers (CANT1-CANT6) are simultaneously turned on, since an instantaneous overcurrent that may damage the CAN transceivers may occur, a parallel turn-on method or a sequential turn-on method may be applied to prevent occurrence of the instantaneous overcurrent.

Figure 5:
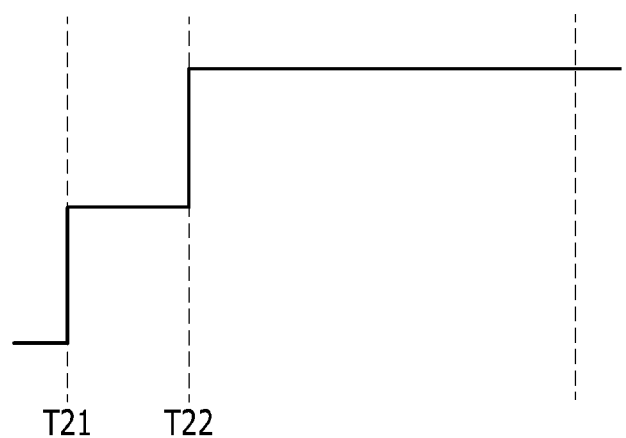
FIG. 5 shows an exemplary operation timing chart based on a parallel method according to an exemplary embodiment of the present invention.
Figure 6:
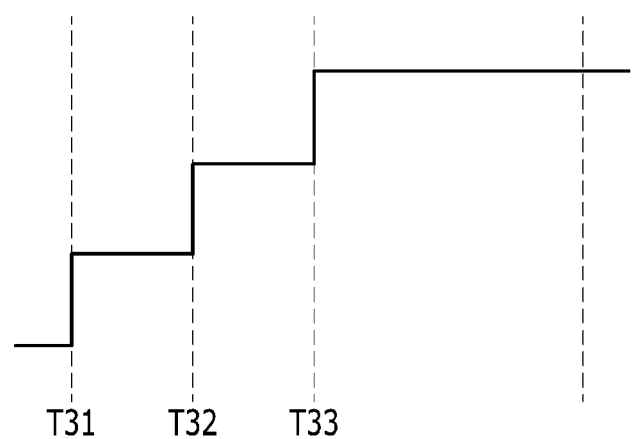
FIG. 6 shows an exemplary operation timing chart based on another parallel method according to an exemplary embodiment of the present invention.

FIG. 5 shows an exemplary operation timing chart based on a parallel method according to an exemplary embodiment of the present invention. FIG. 6 shows an exemplary operation timing chart based on another parallel method according to an exemplary embodiment of the present invention.

As shown in FIG. 5, the CAN transceivers (CANT1, CANT3, and CNAT5) of the CAN transceivers (CANT1-CANT6) may first be turned on at time T21, and then the CAN transceivers (CANT2, CANT4, and CNAT5) may be turned on at time T22. In addition, as shown in FIG. 6, the CAN transceivers (CANT1 and CANT4) of the CAN transceivers (CANT1-CANT6) may first be turned on at time T31, and then the CAN transceiver (CANT2 and CANT5) may be turned on at time T32 and the CAN transceivers (CANT3 and CANT6) may be turned on at time T33, sequentially.

Figure 7:
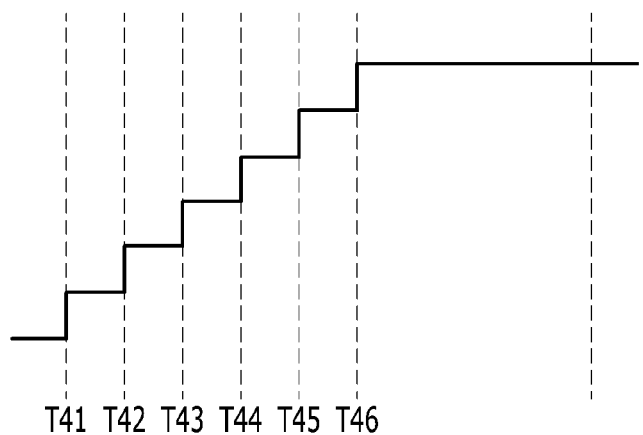
FIG. 7 shows an exemplary operation timing chart based on a sequential method according to an exemplary embodiment of the present invention.

FIG. 7 shows an exemplary operation timing chart based on a sequential method according to an exemplary embodiment of the present invention. As shown in FIG. 7, each of the CAN transceivers (CANT1-CANT6) may be sequentially turned on at a corresponding time of T41-T46. As shown in FIG. 5 to FIG. 7, the CAN transceivers may be turned on according to P-CAN, C-CAN, B-CAN, M-CAN, I-CAN, and D-CAN, which are sequentially priorities of CAN communication lines in a vehicle.

In other words, CAN transceivers that correspond to each of the P-CAN, C-CAN, and B-CAN may be turned on at time T21, and CAN transceivers that correspond to each of the M-CAN, I-CAN, and D-CAN may be turned on at time T22, as shown in FIG. 5. In addition, CAN transceivers that correspond to each of the P-CAN and C-CAN may be turned on at time T31, CAN transceivers that correspond to each of the B-CAN and M-CAN may be turned on at time T32, and CAN transceivers that correspond to each of the I-CAN and D-CAN may be turned on at time T33, as shown in FIG. 6.

A period in which the CAN transceivers may be turned on according to the parallel turn-on method or the sequential turn-on method as shown in FIG. 5 to FIG. 7 may be set based on an allowable period within which the transceiver IC device is turned on. Therefore, according to the exemplary embodiment of the present invention, it may be possible to prevent an EMI noise and an overcurrent which may occur when a plurality of CAN transceivers are simultaneously turned on, by turning on a plurality of CAN transceiver chips of a multi-channel transceiver IC device in parallel or sequentially.

While this invention has been described in connection with what is presently considered to be exemplary embodiments, it is to be understood that the invention is not limited to the disclosed exemplary embodiments, but, on the contrary, is intended to cover various modifications and equivalent arrangements included within the spirit and scope of the appended claims.

DESCRIPTION OF REFERENCE NUMERALS

100: Transceiver IC device
200: Microcomputer
110: Voltage regulator
120: Monitoring portion
130: Wake-up detector
140: Controller
150: SPI communication portion
CANT1-CANT6: CAN transceiver

What is claimed is:

1. A transceiver integrated circuit (IC) device which transmits and receives information and data between a central gateway (CGW) and a plurality of electronic control units (ECUs) using a controller area network (CAN), comprising:
    a plurality of CAN transceivers;
    a monitoring sensor configured to detect whether a transceiver IC device operates normally;
    a wake-up detector configured to detect a wake-up signal transmitted via a network;
    a controller configured to transmit and receive a CAN signal to and from the plurality of CAN transceivers; and
    a serial peripheral interface (SPI) communicator configured to transmit and receive information and data from the controller to and from a microcomputer of the CGW,
    wherein the monitoring sensor is configured to reset the transceiver IC device when an abnormality occurs in the transceiver IC device.

2. The transceiver IC device of claim 1, wherein the transceiver IC device is configured to transmit a message received from the microcomputer to the plurality of electronic control units.

3. The transceiver IC device of claim 1, further comprising:
    a voltage regulator configured to be input with a voltage from an external battery and output a voltage operating the transceiver IC device.

4. The transceiver IC device of claim 3, wherein the monitoring sensor is configured to stop an operation of the voltage regulator and notify the controller of the abnormality of the transceiver IC device when the abnormality occurs in the transceiver IC device.

5. The transceiver IC device of claim 1, wherein the wake-up signal is a signal according to an exterior operating signal generated in a standby mode of a vehicle to cause a dominant electronic control unit among the plurality of electronic control units to wake up the other electronic control units to prepare for operation.

6. A method of operating a transceiver integrated circuit (IC) device comprising a plurality of controller area network (CAN) transceivers which transmit and receive information and data between a central gateway (CGW) and a plurality of electronic control units (ECUs) using a CAN, comprising:
    detecting, by a controller, whether an ignition switch is turned on and a wake-up signal occurs;
    operating, by the controller, the transceiver IC device and a voltage regulator that supplies power to the transceiver IC device to be turned on;
    supplying, by the controller, power output from the voltage regulator to a microcomputer of the CGW to turn on the microcomputer; and
    turning on, by the controller, the plurality of CAN transceivers,
    wherein the turning on of the plurality of CAN transceivers comprises:
        sequentially turning on the plurality of CAN transceivers, or simultaneously turning on at least two CAN transceivers among the plurality of CAN transceivers.

7. The method of claim 6, further comprising:
    operating, by the controller, a serial peripheral interface (SPI) communication portion to be turned on when the microcomputer is initialized by the power supplied from the voltage regulator.

8. The method of claim 7, wherein the operating of the transceiver IC device includes:
    initializing, by the controller, transmitters of the plurality of CAN transceivers for a first time period; and
    initializing, by the controller, receivers of the plurality of CAN transceivers for a second time period.

9. The method of claim 8, wherein a least time in which the transceiver IC device is turned on is a predetermined ready period after the first time period for which the transmitters are initialized.

10. The method of claim 9, further comprising:
    turning on, by the controller, at least one ECU among the plurality of ECUs, wherein a maximum time in which the transceiver IC device is turned on is a longer period from among a third time period from when the ignition switch is turned on to when the SPI is turned on and a fourth time period that is a sum of the first time period, the second time period, and a time period in which the at least one ECU is turned on.

11. A non-transitory computer readable medium containing program instructions executed by a controller, the computer readable medium comprising:
    program instructions that detect whether an ignition switch is turned on and a wake-up signal occurs;
    program instructions that operate a transceiver integrated circuit (IC) device and a voltage regulator that supplies power to the transceiver IC device to be turned on;
    program instructions that supply power output from the voltage regulator to a microcomputer of a central gateway (CGW) to turn on the microcomputer; and
    program instructions that turn on a plurality of controller area network (CAN) transceivers,
    wherein when the plurality of CAN transceivers are turned on, the plurality of CAN transceivers are turned on sequentially, or at least two CAN transceivers among the plurality of CAN transceivers are turned on simultaneously.

12. The non-transitory computer readable medium of claim 11, further comprising:
    program instructions that operate a serial peripheral interface (SPI) communication portion to be turned on when the microcomputer is initialized by the power supplied from the voltage regulator.

13. The non-transitory computer readable medium of claim 12, further comprising:
    program instructions that initialize transmitters of the plurality of CAN transceivers for a first time period; and
    program instructions that initialize receivers of the plurality of CAN transceivers for a second time period.

14. The non-transitory computer readable medium of claim 13, wherein a least time in which the transceiver IC device is turned on is a predetermined ready period after the first time period for which the transmitters are initialized.

15. The non-transitory computer readable medium of claim 14, further comprising:
- program instructions that turn on at least one electronic control unit (ECU) among a plurality of ECUs, wherein a maximum time in which the transceiver IC device is turned on is a longer period from among a third time period from when the ignition switch is turned on to when the SPI is turned on and a fourth time period that is a sum of the first time period, the second time period, and a time period in which the at least one ECU is turned on.

* * * * *